C. C. JENSEN AND G. H. IRWIN.
AUTOMOBILE FENDER.
APPLICATION FILED APR. 6, 1918.

1,379,822.

Patented May 31, 1921
5 SHEETS—SHEET 1.

C. C. JENSEN AND G. H. IRWIN.
AUTOMOBILE FENDER.
APPLICATION FILED APR. 6, 1918.

1,379,822.

Patented May 31, 1921.
5 SHEETS—SHEET 5.

UNITED STATES PATENT OFFICE.

CARL C. JENSEN AND GEORGE H. IRWIN, OF CHICAGO, ILLINOIS, ASSIGNORS TO STANDARD FENDER CO., OF CHICAGO, ILLINOIS, A CORPORATION OF DELAWARE.

AUTOMOBILE-FENDER.

1,379,822.    Specification of Letters Patent.    Patented May 31, 1921.

Application filed April 6, 1918. Serial No. 227,106.

*To all whom it may concern:*

Be it known that we, CARL C. JENSEN and GEORGE H. IRWIN, citizens of the United States, residing at Chicago, in the county of Cook and State of Illinois, have invented a certain new and useful Improvement in Automobile-Fenders, of which the following is a full, clear, concise, and exact description, reference being had to the accompanying drawings, forming a part of this specification.

The invention relates to fenders and particularly to that type of these devices which is adapted to be applied to automobile trucks or similar vehicles, and which employs an arrangement which will effectively operate to prevent a person, animal or other object from being injured or run over, should the latter be in the path of the vehicle. The construction of the fender is such that protection against breakage is afforded to the radiator, lamps or other breakable portions of the machine or accessories, and which will operate effectively to pick up a person or other object while the vehicle is in motion, with the possibility of injury to the person reduced to a minimum.

The construction of the invention contemplates the use of sections which may be raised or lowered into and out of operative position, to afford access to the various portions of the vehicle, and to facilitate the vehicle's passing obstructions in its path when the space wherein same is operated is restricted or when the space wherein the vehicle is stored is limited, this last named feature being accomplished by a means operable from the seat of the operator, or may be caused to assume an elevated position by means other than the means last referred to, when desired. The lifting of this section is assisted by a mechanism which is operable when this section has been moved beyond a predetermined point in its travel, this mechanism also forming a means whereby the scoop section is held in its raised or elevated position when this is found to be of advantage or desirable.

It is another object of the invention to provide a mechanism for the scoop section which is designated to yieldably hold the scoop section in elevated position and which will permit this portion to be lowered when force or weight is applied thereto, and which is operable to adjust the height of the scoop section to any desired position.

The invention has as a further object the provision of yieldably mounting the various portions of the device which may in its operation be brought into contact with a person or object.

The invention has various objects, elements of construction, and combinations, all of which are simple and effective in operation, and which will accomplish these and various other objects in a simple and expeditious manner without resulting in a corresponding reduction in efficiency.

The invention will be more readily understood and explained in conjunction with the accompanying drawings, in which—

Fig. 8 is a side elevation of the uppermost end of the reinforcing member shown in Fig. 7;

The embodiment of the invention illustrated in the drawings contemplates the use of portions 15, 16 and 17, each of which is provided with the metal fabric 18. The portion 15 is yieldingly mounted in front of the radiator to protect it against objects which might come in contact therewith. The sections 16 and 17 extend across the front of the vehicle and beyond the wheels thereof, and are also yieldingly mounted and arranged to be moved bodily with respect to each other. These portions generally designated 16 and 17, form the fender and prevent injury to a person or object. The portion 16 is composed of the strip 19 and the bar 20, the bar 20 forming the lowermost edge of the portion 16. The ends of the strip 19 are attached to the bar 20 and extend upwardly therefrom, the uppermost portions being bent upwardly and rearwardly. The portion of the strip 19 which is parallel with the bar 20 is provided with the recessed portion 21, and is constructed in this manner to permit of access to the crank and to permit the portion 15 to be swung downwardly with the portion 16 in place, when occasion demands this to be done. This strip 19 is preferably U-shaped in cross section and receives the ends of the strips forming the fabric 23, the opposite ends of these strips being suitably secured to the bar 20. The strips forming the fabric 23 are spot welded or otherwise connected with each other as indicated at 24. By this construction and by virtue of the fact that the ends of the strips forming the fabric are connected to the frame 19 and bar 20, a strong yet yieldable surface results which has all of the qualities demanded of a surface for the purpose intended. The lower or scoop section 17 extends substantially from the lowermost edge of the portion 16 and projects forwardly therefrom a suitable distance to produce a surface upon which an object may fall or rest when the device comes in contact with the object. This portion 17 is yieldably mounted and may be adjusted to various heights from the surface upon which the vehicle is traveling, and may also be operated to raise the same above a stone or other obstruction which may be in its path, and is further constructed so that it may be bodily lifted and held in this raised or elevated position. The scoop portion 17 is composed of a strip 25, which is similar in cross section to the strip 19. This strip 25 is connected to the bar 26 which is arranged parallel to the bar 20 of the portion 16. The strip 25 with the bar 26 forms a frame within which is arranged the fabric 27, the ends of which are secured within the frame formed by the strip 25 and bar 26. The strips forming this fabric may also be spot welded or otherwise secured to each other at their intersections, as explained in connection with the fabric of the portion 16.

Figure 1:
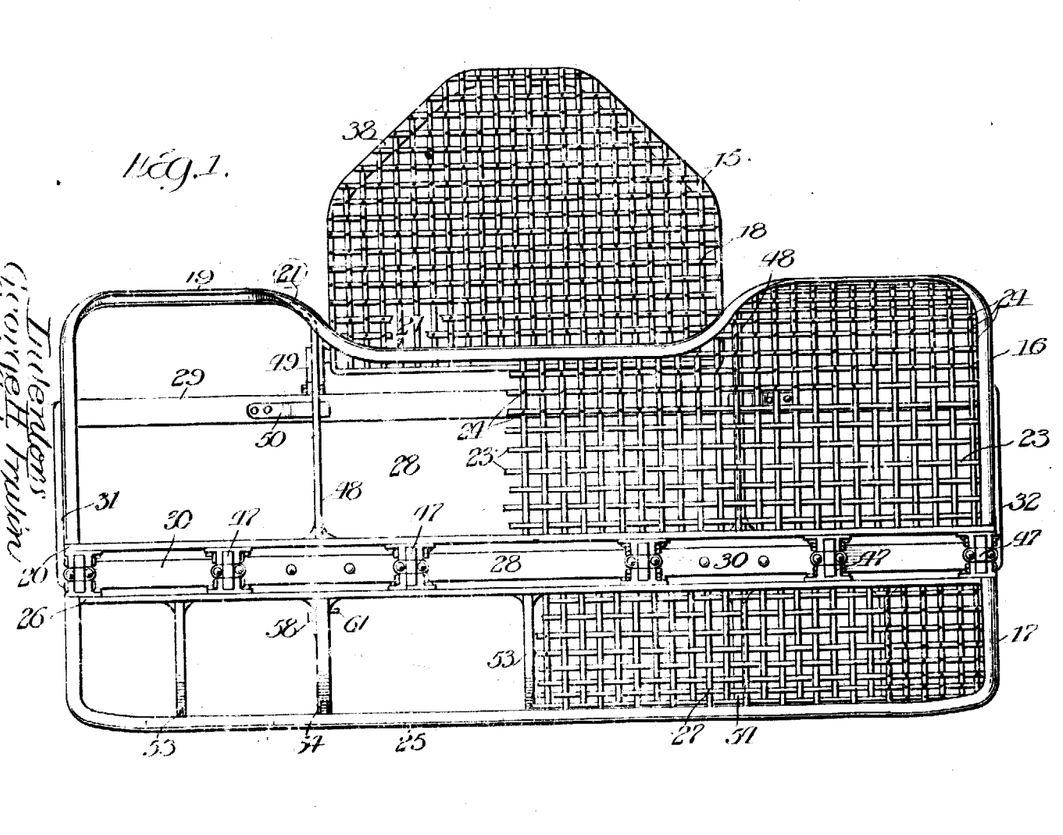
Figure 1 is a front elevation of the fender.
Figure 2:
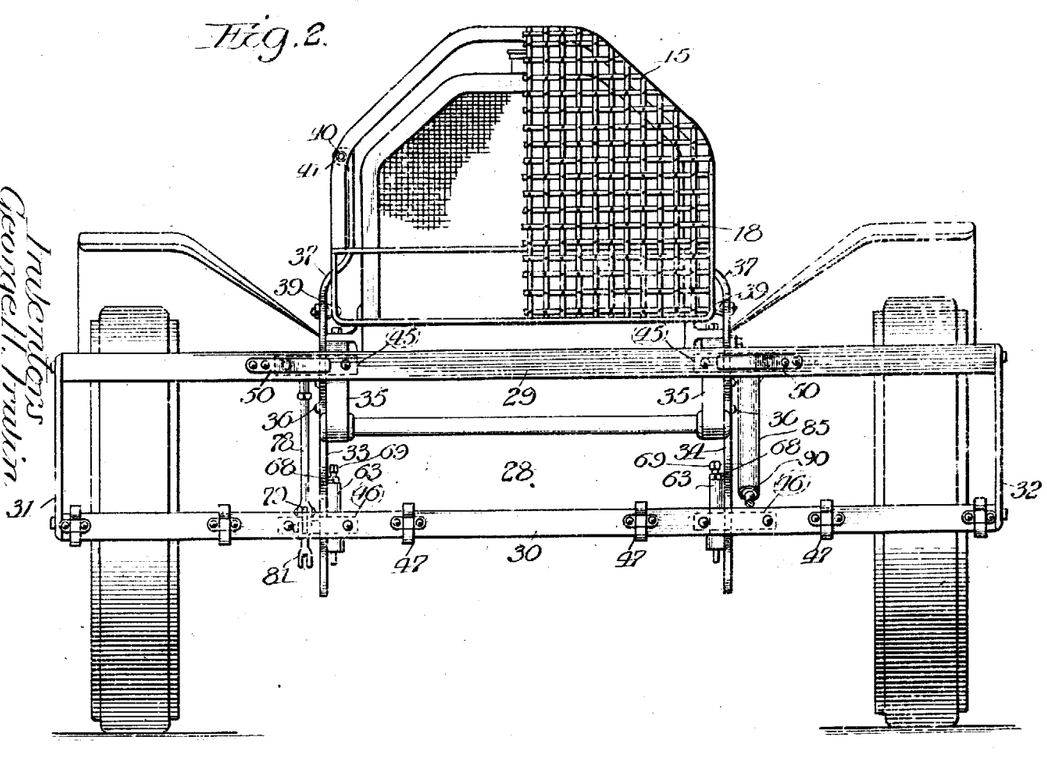
Fig. 2 is a front elevation of the means whereby the fender portions are mounted in position with relation to the vehicle.

The portion 16 and the scoop section 17 are both mounted upon and in front of a supporting structure generally designated 28 which in turn is supported upon and carried by the chassis or other portion of the vehicle. This supporting structure 28 is composed of the parallel, preferably channel-shaped, spaced apart buffer bars 29 and 30, which extend a suitable distance beyond the fender sections and are united at their ends by the members 31 and 32. This framework is connected to and supported by brackets 33 and 34 which are illustrated as being secured to the side frames of the chassis 35—35 of the vehicle. These brackets conveniently form supports for various other elements of construction which will be explained more in detail hereinafter. The brackets 33 and 34 extend upwardly and downwardly beyond the side frames of the chassis 35—35, and are secured thereto by the bolts 36. To the uppermost arm 37 of this bracket is secured the frame 38 of the portion 15, it being pivoted thereto at 39 and provided with the yieldable connection 40 which is composed of the bolt 41 and spring 42 which holds the portion 15 with relation to the arm. These brackets are further provided with the projections 43 and 44, each of which is provided with the transverse portions 45 and 46 which fit into the channeled portion of the buffer bars 29 and 30. These parts are connected together in any suitable or convenient manner. The portions 16 and 17 are hingedly connected to the buffer bar 30 by the hinges 47 which permit either of the portions 16 and 17 to be manipulated independently of the other. The upper portion 16 is provided with reinforcing bars 48 which are arranged between the strip 25 and bar 26 at suitable distances throughout the length of the fender portion 16. One or more of these reinforcing bars carries a spring controlled latch 49, which is constructed to hook over the buffer bar 29 to releasably hold the fender portion 16 in place. The buffer bar 29 is provided with leaf springs 50, which are interposed between the reinforcing bar 48 and the buffer bar. This permits the uppermost section to yield somewhat when any force is exerted upon it, and also holds the portion 16 in its proper position with relation to coöperating portions of the device. The latches 49 are spring controlled as indicated at 51. This insures against any accidental separation of the parts, due to various causes, yet permits the portion 16 to yield and be properly held in place. These latches are preferably arranged near the terminations of the recessed portions 21 of the uppermost fender portion 16. From the foregoing explanation of the structure of the uppermost portion 16, it can readily be seen that by releasing the latches 48, the portion 16 may be swung upon the hinges 47 to its lowered position, in which access may be had to the various portions of the machine, such as the crank, headlight, or any other part, also that this portion may yield when any force is exerted against the same.

Figures 4, 6, 7, 9:
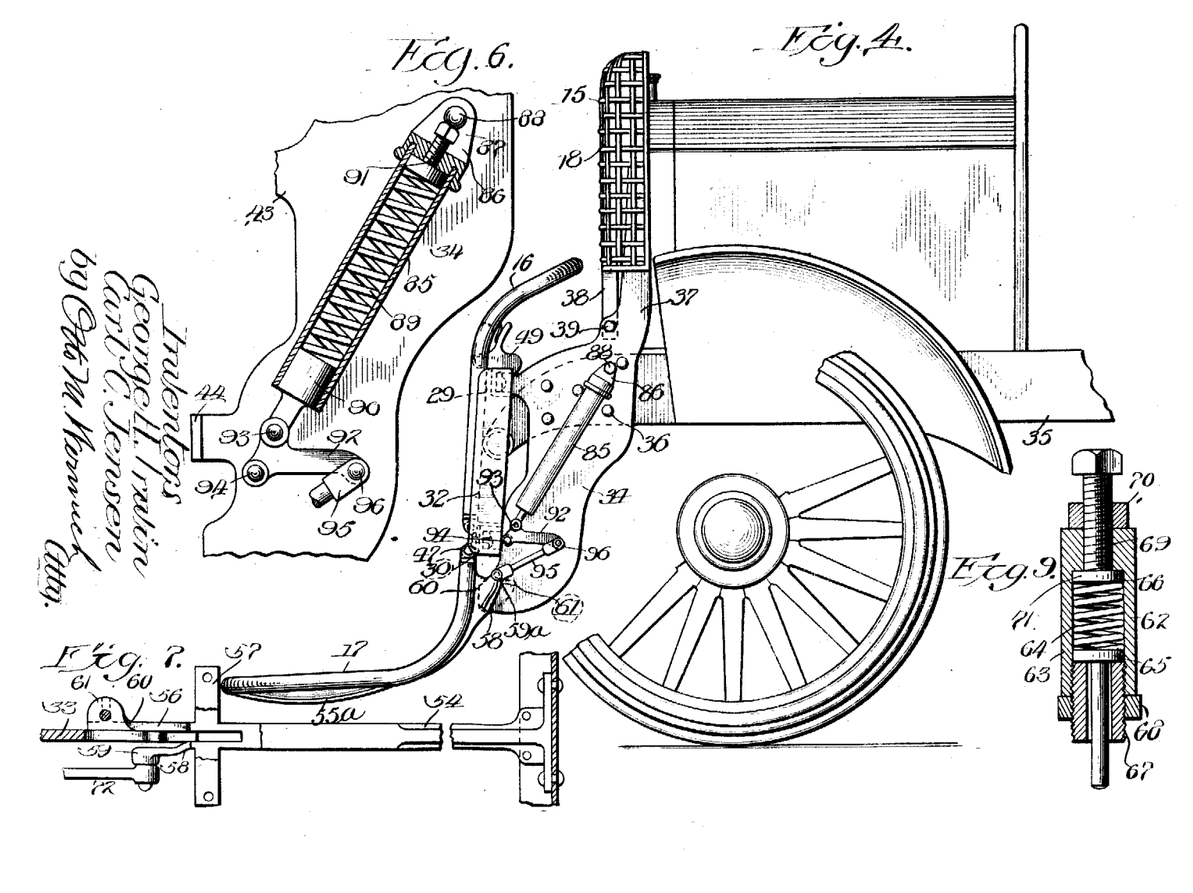
Fig. 4 is a side elevation of the opposite side of the vehicle, showing a means for assisting the lever mechanism shown in Fig. 3.
Fig. 6 is an enlarged sectional view of one of the elements which coöperates with the device shown in Fig. 4.
Fig. 7 is a plan view of a reinforcing element, showing the manner in which it coöperates with its respective supporting bracket and also showing the particular construction of one end whereby said end may coöperate with a buffing mechanism and also with the lever mechanism shown in Fig. 3.
Fig. 9 is a sectional view illustrating in detail the buffer mechanism which coöperates with the reinforcing bar shown in Figs. 7 and 8.

The lowermost or scoop portion 17 of the device is, as before stated, hingedly connected to the buffer bar 30 and extends downwardly and forwardly therefrom, the most forward end being arranged a suitable distance in advance of the vertical portion thereof and the portion 16. This lowermost portion is provided with a plurality of reinforcing members 53 and 54, which coincide with the contour of the scoop section, when viewed from a side. The reinforcing members 54 are of a somewhat different construction than the others and are arranged in substantial alinement with the brackets 33 and 34, and receive the lowermost end of said brackets. These reinforcing members are constructed so as to coöperate with the buffer mechanism and also the lifting mechanism which will be explained more in detail in the following. Some or all of these reinforcing members may be provided with the skid shoes 55ª, which prevent injury to the scoop section of the fender when the same is lowered and brought into contact with the ground, by excess weight being applied thereto. The ends of the reinforcing members 54 nearest the brackets 33 and 34 are bifurcated as indicated at 56, and receive the ends of the brackets 33 and 34 which are arranged in the bifurcations in a manner to permit the scoop section to swing upon its hinges. The arrangement also assists in taking any end thrust which might be applied to the scoop section and also adds materially to the rigidity of the structure in other respects. These bifurcations extend somewhat to the rear of the fender sections 16 and 17, and are provided with the T-shaped end 57 whereby the reinforcing members are attached to the bar 26. One of these bifurcations as 58 is provided with an eyelet 59 whereby the reinforcing member and the lever actuating mechanism generally designated 72 may be connected together. The other member of the bifurcation as 60 is arranged upon the other side of the bracket, and is provided with a ledge 61 which bears against the buffer mechanism 62. Each of the brackets 33 and 34 is provided with one of these buffer mechanisms which engage the ends of the reinforcing members 54 which are a part of the scoop portion. Thus the whole scoop portion will be properly held in elevated position and permitted to yield when a weight is applied thereto. This buffer construction is such that it may be operated to adjust the height at which the scoop section will be maintained from the ground. The arrangement of the device herein illustrated for accomplishing this end includes a casing 63 which is mounted upon the respective brackets 33 and 34. Within this casing is arranged the expansion spring 64, the opposite ends of which bear against the plunger 65 and the set screw 66, respectively. This plunger is slidably arranged in a member 67 which is arranged for adjustment by being threaded into the lowermost end of the shell. The member 67 is provided with a set nut 68 which holds the member in set relation to the other parts of the device. The uppermost end of the casing 63 is also threaded to receive the end of another set screw 69, which is also provided with the set nut 70. A disk 71 is arranged between the end of the set screw 69 and the expansion spring 64. Thus by operating the set screw 69 the tension upon the spring is increased or diminished, which results in that greater or less weight will have to be applied to the scoop section to lower it, and by adjusting the member 67 the scoop section may be raised and lowered so that the same will maintain various heights or positions with relation to the ground.

Figure 3:
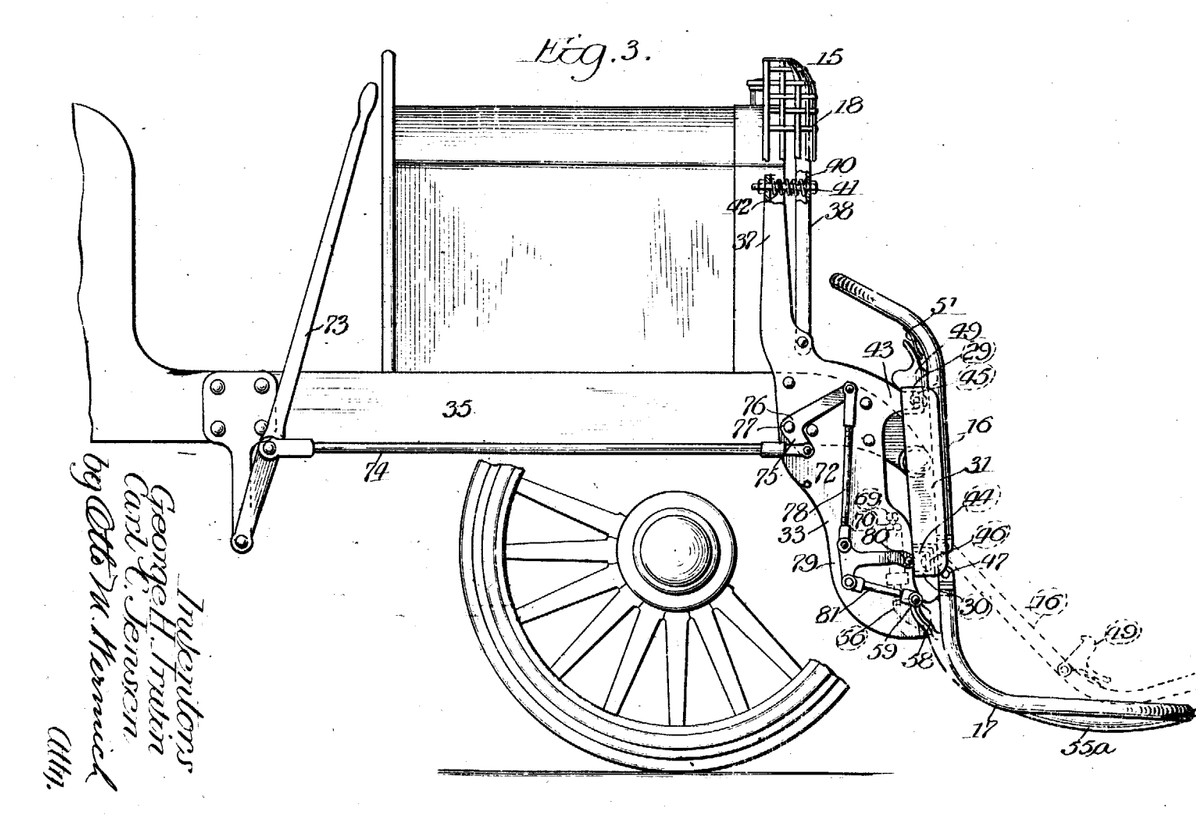
Fig. 3 is a side view showing a lever mechanism for raising and lowering one of the fender sections.

The lever mechanism generally designated 72 is designed to move the scoop section 17 into and out of active position. This mechanism will comprise such a construction and arrangement of a system of levers and associated elements that the operating or hand lever will be required to be moved through but a relatively short arc in order to swing or otherwise move the fender section a considerable distance. The scoop section 17 is swung upwardly or lowered through the movement of a manually operable lever 73 mounted adjacent the driver's seat of the vehicle, and pivotally connected to this lever is a connecting rod 74 which extends forwardly and is pivotally connected to the shorter arm 75 of the bell crank lever 76 mounted for rocking movement, as at 77 upon one of the brackets as 33. A link 78 is pivotally connected to the longer arm of the bell crank lever, and this link is a type which may be adjusted as to its length. The opposite end of this link 78 is connected to a rock arm 79 which is also pivoted to the bracket 33 at 80. To the free end of the rock arm 79 is connected another link 81 which is secured to the eyelet 59 of one of the bifurcated reinforcing members. The connection of the link 81 with the rock arm 79 is arranged somewhat in advance of the connection between the link 78 and rock arm 79.

Figures 5, 6:
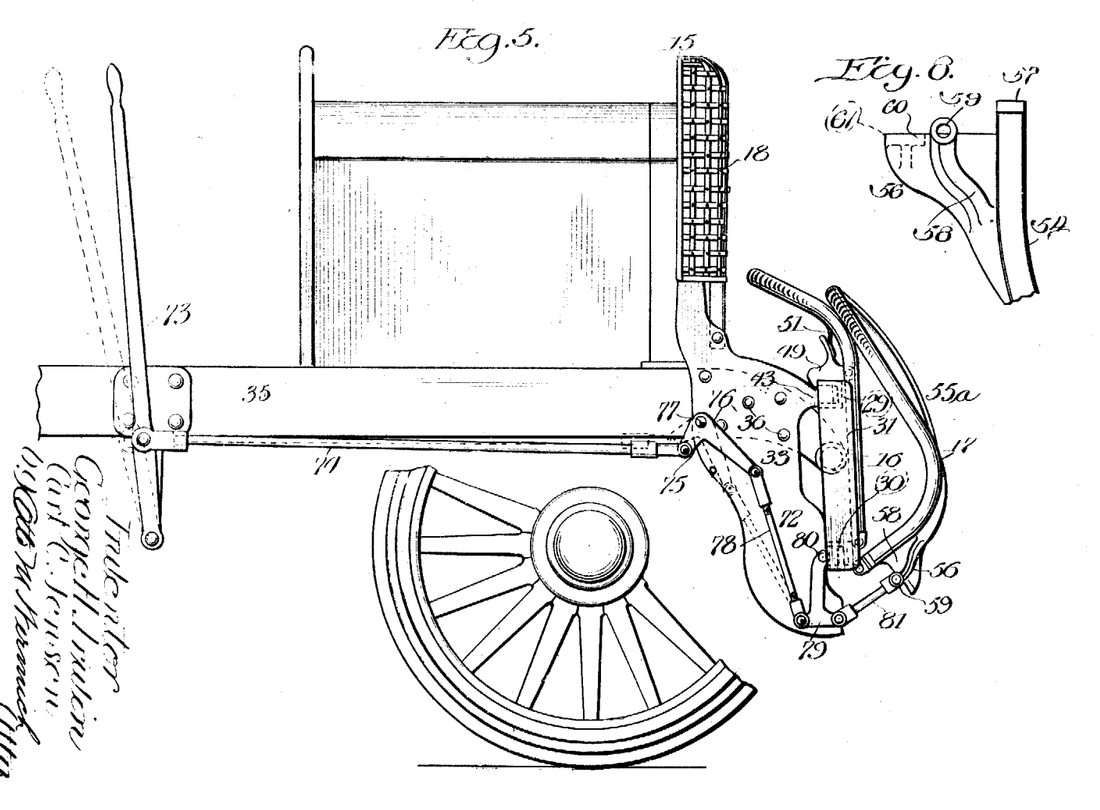
Fig. 5 is a view similar to Fig. 3, showing the scoop portion of the fender in elevated position.

It will be observed that the eyelet 59 is located between the pivot or hinge for the fender and the heavier or body portion of said section. As a consequence the rear portion of the fender also constitutes, in effect, a lever, the pivot being located between the fulcrum and the weight to be lifted, which is the scoop section 17. From the foregoing it will be understood that when the hand lever 73 is moved rearwardly a pull will be exerted upon the rod 74 which will serve to swing the longer arm of the bell crank lever 76 downwardly and move the link 78 in a corresponding direction. The force exerted is transmitted to the arm or lever 79 and this arm will be swung downwardly and the link 81 will be forced forwardly and the fender section 17 will be swung upwardly as shown in Fig. 5 of the drawing. When it is desired to lower the fender section, the movement of the various elements will of course be reversed. By actuating the lever mechanism 72 so that the parts assume the position shown in dotted lines in Fig. 5, the scoop section is locked against being lowered unless actuated by the lever mechanism.

The invention has as one of its objects a provision whereby an auxiliary lifting mechanism for the scoop portion 17 of the fender is supplied, this means being so constructed that it will not in any way affect the proper operation of the fender when the scoop section is in active position, but will only become active after the fender section has been swung upwardly a short distance, so that while the means employed in the device may be of sufficient strength in itself to swing the fender section upwardly to inactive position, the means will be inactive when the fender section is lowered, or in other words, will not exert a tendency to swing the section upwardly. This means is preferably mounted upon one of the brackets as 34, and includes a casing 85, having a bracket 86 which has a lug 87 pivotally connected to the bracket as at 88. This casing extends in a downwardly and forwardly direction from its pivot and incases a coiled spring 89 which reacts between the plunger 90 and the adjustable element 91. The plunger 90 is fitted into the lowermost end of the casing and has one end pivotally connected to a rock arm 92, as at 93. This rock arm is in turn pivoted as at 94 to the bracket 34, the pivots 93 and 94 being arranged adjacent each other. A link 95 is connected to the rearwardmost end of the rock arm 92 as indicated at 96, and extends downwardly and forwardly from this pivot to the eyelet 59ª similar to the eyelet 59 of the other reinforcing rib of the scoop portion 17 of the fender. It will be noted that the pivot of this scoop portion is arranged somewhat above the connection of the link 95 and eyelet 59ª. It will further be noted that the pivot 93 is arranged somewhat in advance of the pivot 94 of the arm 92, when the scoop portion is in lowered or operative position. When the parts are in this last named position the spring 89 is compressed and exerts a downward pressure upon the pivot 93 which holds the rear end of the rock arm 92 in elevated position. When the main lifting mechanism is actuated, however, to swing the scoop section 17 upwardly the pivot 93 will be moved to the rear of the pivot 94 at which time the spring 89 will expand and force the rock arm 92 downwardly and the link 95 forwardly, thereby assisting in raising the fender section 17.

From the foregoing explanation of the device it can be seen that either of the fender sections 16 and 17 may be raised or lowered, also that the protecting member 15 may be raised and lowered, and that the scoop portion of the device may be partially or wholly raised and held in this elevated position should this be found necessary or desirable.

Furthermore, the various fender elements are all resilient and may yield when a force is applied thereto, and that the lowermost or scoop portion of the device may be adjusted to various heights from the surface upon which the vehicle is being operated.

Having thus described one embodiment of the invention, it is evident that changes and modifications may be resorted to without departing from the spirit of the appended claims.

What we claim and desire to cover by Letters Patent is:

1. In a fender, the combination of a scoop section and a section arranged in juxtaposition to the scoop section, both of said sections being constructed to be raised and lowered independently of each other, one of said sections having means for raising the same and holding it in said last named position and being arranged to be automatically lowered when the holding means is released.

2. In a fender, the combination of a scoop section and a section arranged adjacent the scoop section, the last mentioned section being constructed to be raised and lowered with respect to the scoop section, and the scoop section being constructed to be moved into juxtaposition to the section arranged adjacent the scoop section, and means including pivoted members, the pivots of which may be arranged to lock the scoop section in raised position.

3. A fender including a scoop section supported for upward swinging movement, a section normally occupying an upright position above the scoop section and adapted to be swung downwardly from its said normal position, and a yieldably supported section above the second mentioned section.

4. A fender including a support, a scoop section mounted thereon and yieldably supported in active position, a fender section mounted upon the said support and rearwardly yieldable, and means yieldably resisting the rearward movement of the second mentioned section.

5. A fender including a support, a scoop section mounted thereon and yieldably supported in active position, a fender section mounted upon the said support and rearwardly yieldable, means yieldably resisting the rearward movement of the second mentioned section, and a yieldably supported section above the second mentioned section.

6. A fender including a scoop section supported for upward swinging movement, a second normally occupying an upright position above the scoop section and adapted to be swung downwardly from its said normal position, the second mentioned section being yieldable in one direction, means for supporting the section in upright position and yieldably resisting the said movement of the said section.

7. A fender including a scoop section, a section mounted above the scoop section and adapted to be swung downwardly from its normal position, the second mentioned section being hingedly mounted at its lower side, and means yieldably resisting the rearward movement of the said second mentioned section.

8. A fender including a scoop section yieldably supported in active position and adapted to be swung upwardly, means for swinging the said section upwardly and for lowering the section, and a section normally occupying an upright position above the scoop section and adapted to be swung downwardly from its said normal position.

9. A fender including a scoop section supported for upward swinging movement and for rearward movement upon receiving impact, means yieldably resisting the rearward movement of the said section, a section mounted above the first mentioned section for rearward swinging movement and for swinging movement in a downward direction, means normally supporting the second mentioned section in upright position, and means yieldably resisting rearward movement thereof.

10. A fender including a scoop section supported for upward swinging movement and for rearward movement upon receiving impact, means yieldably resisting the rearward movement of the said section, a section mounted above the first mentioned section for rearward swinging movement and for swinging movement in a downward direction, means normally supporting the second mentioned section in upright position, means yieldably resisting rearward movement thereof, and a section supported above the second mentioned section for rearward movement, and means yieldably resisting the rearward movement of the last mentioned section.

11. In a fender, bracket members, a support carried by the bracket members, a scoop section hingedly connected with the said support and adapted to be swung upwardly, a fender section hingedly mounted upon the support and normally occupying an upright position above the scoop section, the said second mentioned section being adapted to be swung downwardly, and means normally holding the second mentioned section in upright position.

12. In a fender, bracket members, a support carried by the bracket members, a scoop section hingedly connected with the said support and adapted to be swung upwardly, a fender section hingedly mounted upon the support and normally occupying an upright position above the scoop section, the said second mentioned section being adapted to be swung downwardly, means normally holding the second mentioned section in upright position, and means yieldably resisting rearward movement of the second mentioned section.

13. In a fender, attaching bracket members, a support carried by the bracket members, a scoop section hingedly mounted upon the support and adapted to be swung upwardly, a section hingedly mounted upon the support and normally occupying an upright position above the scoop section and adapted to be swung downwardly, and a section mounted above the second mentioned section and extending between the said bracket members.

14. In a fender, attaching bracket members, a support carried by the bracket members, a scoop section hingedly mounted upon the support and adapted to be swung upwardly, a section hingedly mounted upon the support and normally occupying an upward position above the scoop section and adapted to be swung downwardly, a section mounted above the second mentioned section and extending between the said bracket members, the last mentioned section being mounted for tilting movement, and means yieldably resisting the tilting movement of the said last mentioned section.

15. In a fender, a support, a scoop section hingedly mounted upon the support, a section hingedly mounted upon the support and normally occupying an upright position above the first mentioned section, a stop member for limiting the rearward movement of the second mentioned section, and means carried by the stop member and yieldably resisting such movement of the said section.

16. In a fender, spaced attaching brackets, a support carried thereby, a scoop fender section hingedly supported from the said support and adapted to be swung upwardly, means carried by the bracket members for resisting the rearward swinging movement of the said section, a section hingedly mounted upon the support and normally occupying an upright position above the first mentioned section, a stop member carried by the brackets and arranged to limit the rearward swinging movement of the second mentioned section, means carried by the stop member for yieldably resisting such movement, a fender section pivotally mounted at its lower end between the said bracket members, and means carried by the brackets for yieldably resisting the rearward movement of the last mentioned section.

17. In a fender, a support, a scoop section hingedly mounted upon the support and adapted to have yieldable rearward movement and to be swung upwardly out of active position, means for so swinging the said section, a stop member mounted above the said support, a hingedly mounted fender section arranged above the first mentioned section and normally occupying an upright position and arranged to have rearward movement, means carried by the said stop member and yieldably resisting rearward movement of the second mentioned fender section, and means carried by the said second mentioned fender section and coöperating with the stop member to normally support the said section in upright position.

18. In a fender, attaching bracket members, a support carried by the said members, a scoop section hingedly mounted upon the said support and arranged for upward swinging movement, lever mechanism for moving the said section mounted upon one of the said brackets, means mounted upon one of the said brackets for yieldably resisting movement of the said section in an opposite direction, means mounted upon one of the said brackets and connected with the said section tending to swing the same upwardly and constituting an auxiliary means for raising the section, a section hingedly supported upon the said support and normally occupying an upright position above the first mentioned section, the second mentioned section being adapted to be swung downwardly and to swing upon the first mentioned section, the said second mentioned section comprising side frames and an intermediate frame, the said side frames projecting above the top of the intermediate frame, means normally holding the section in upright position, and a third fender section mounted between the said attaching bracket members and yieldably supported in upright position above the intermediate frame of the second mentioned section.

19. In a device of the class described, the combination of a fender section and a scoop section, the scoop section being constructed to be positioned in juxtaposition to the fender section, pivoted means for moving said scoop section to said last named position, the pivots of said means being movable to a position to lock said scoop section in said position.

20. In a fender, a support, a scoop section mounted thereon and extending downwardly and thence forwardly from the said support, a section mounted upon the said support in upright position above the first mentioned upright position and extending upwardly and thence upwardly and rearwardly from the said support, and a third fender section located rearwardly of the upper end of the second mentioned section and occupying an upright position thereabove.

21. A fender including a fender section movable into and out of active position, means operable to so move the section, and an automatically operable auxiliary moving means coacting with the fender and arranged to be inactive when the fender is in active position.

22. A fender including a fender section movable into and out of active position, means operable to so move the section, and an auxiliary moving means coacting with the fender and arranged to be inactive when the fender is in active position and to be active to move the fender section toward active to move the fender section when the said section has been partly moved toward such position.

23. A fender including a fender section mounted for swinging movement into and out of active position, means operable to swing the said section upwardly to inactive position, and an auxiliary moving means coacting with the fender and arranged to be inactive in the full lowered position of the fender.

24. A fender including a fender section mounted for swinging movement into and out of active position, means operable to swing the section upwardly to inactive position, and a spring actuated element having operative connection with the fender and arranged to assist in moving the fender toward inactive position.

25. A fender including a fender section mounted for swinging movement into and out of active position, means operable to swing the section upwardly to inactive position, an oscillatory member having operative connection with the fender section, and a spring pressed plunger connected with the oscillatory member and arranged to swing the same in a direction to cause upward swinging movement of the said fender section.

26. A fender including a fender section movable into and out of active position, means operable to swing the fender section upwardly to inactive position, a rock arm pivoted at one end, connections between the fender section and the said arm at a point remote from its pivot, a member mounted for swinging movement, a spring carried thereby, and a plunger mounted thereon and acted upon by the spring, the said plunger being connected pivotally to the arm at a point adjacent the pivot for the arm.

27. A fender including a fender section movable into and out of active position, means operable to swing the fender section upwardly to inactive position, a rock arm pivoted at one end, connection between the fender section and the said arm at a point remote from its pivot, a member mounted for swinging movement, a spring carried thereby, and a plunger mounted thereon and acted upon by the spring, the said plunger being connected pivotally to the arm at a point adjacent the pivot for the arm, the pivot for the said plunger being arranged in the active position of the fender to lie at one side of a line passing through the pivot for the arm and the pivot for the said support and the spring being arranged in such position of the parts to be inactive to swing the fender section in an upward direction.

28. In a fender, a movable fender section, and a buffer for the said section embodying means for adjusting the section with relation to the ground surface, said means permitting the fender section to be lowered from its adjusted position.

29. In a fender having a fender section mounted for swinging movement, means for yieldably resisting such movement in one direction and for yieldably supporting the fender in active position, said means acting upon the pivoted end of the fender section.

30. In a fender having a fender section mounted for swinging movement, means for yieldably resisting such movement in one direction and for yieldably supporting the fender in active position, said means being arranged at the pivot of said section and operative to vary the elevation of the engaging end of the fender.

31. In a fender, a movable fender section having an abutment, and a buffer for the said section having a spring pressed plunger engageable by the said abutment, and means for adjusting the position of the plunger with relation to the said abutment.

32. A fender including a fender section and a scoop section, both of said sections being movable into and out of operable position, means for moving said scoop section, and said means providing the means for holding said scoop section in inoperative position.

33. A fender including a scoop section movable into and out of operable position and normally occupying an operative position, means for moving said section into operative position, said means providing the means for holding said section in inoperative position.

34. A fender including a fender section and a scoop section, said scoop section being mounted to swing into and out of operable position relative to the fender section, and means for moving said section, said means providing the means for holding said scoop section in inoperative position.

35. A fender including a scoop section normally occupying a lowered position and being movable into and out of inoperative position, means for raising said section into operable position, said means forming a means for locking said section in raised position.

36. A fender including a scoop section normally occupying a lowered position and being movable into and out of operable position, means for raising said section, said means including a lever mechanism, the pivots of said lever mechanism being operable to prevent the lowering of said section when said section is raised.

37. In a device of the class described, the combination of a fender section and a scoop section, the scoop section being constructed to be swung upwardly into juxtaposition to the fender section. means for moving said section into said last named position, said means including a lever mechanism the pivots of which are constructed to be arranged to lock said scoop section in elevated position.

38. In a fender, the combination of brackets secured to a vehicle, a member extending across the vehicle and being rigidly secured to the brackets, fender sections secured to said member, one of said fender sections being movable, and means having pivots which may be arranged to lock said movable section with relation to the first mentioned member.

39. In a fender, the combination of a support composed of parallel members, fender sections mounted upon one of said members, one of said sections being movable with respect to said members, and having a lever mechanism the pivots of which may be arranged to lock the movable fender section with respect to said members.

40. In a fender, the combination of brackets secured to a vehicle, a member extending across the vehicle and being secured to the brackets. fender sections secured to and carried by the same portion of said member, one of said fender sections being movable, and means whereby said movable section is held with relation to the first mentioned member, said means including a spring latch for engaging said member.

41. In a fender, the combination of a support extending beyond the wheels of the vehicle to which the fender is attached, and a fender portion mounted upon the support, said support being constructed to permit the reception of said fender portion and to protect the ends thereof.

42. In a fender, the combination of a support composed of a pair of parallel bars, a scoop section and a fender portion connected to one of said bars, the fender portion being movable with relation to said bars and having means for releasably securing the same with relation to said bars.

43. In a fender the combination of a scoop section normally occupying a lowered position, pivoted means for moving said scoop section into inoperative position, the pivots of said means being movable into a position to lock the scoop section in inoperative position, and means for holding the pivots in said last named position.

44. A fender including a support, a scoop section mounted upon the support, said scoop section being arranged to be moved with relation to the support and having a bifurcated portion arranged to receive the support, means for moving the scoop section, said means being operatively connected with one of the bifurcations and means for yieldably supporting the scoop section in active position, said means coöperating with the other of said bifurcations.

45. A fender including a support, a scoop section mounted upon the support, said scoop section being arranged to be moved with relation to the support, and having a bifurcated portion arranged to receive the support, means for moving said scoop section, said means being operatively connected with one of the bifurcations of the scoop portion.

46. A fender including a support, a scoop section mounted upon the support, said scoop section being arranged to be moved with relation to the support and having a bifurcated portion arranged to receive the support, means for yieldingly supporting said section in active position, said means coöperating with one of the bifurcations of the scoop section.

47. A fender including a support, a scoop section mounted upon the support, said scoop section being arranged to be moved with relation to the support and having a bifurcated portion movable with respect to the support and arranged to receive the support.

48. A fender including a support, a scoop section mounted upon the support, said scoop section being arranged to be moved with relation to the support and having a bifurcated portion constructed to receive the support, means for moving the scoop section, said means being operatively connected with one of the bifurcations of the scoop section, and means for assisting said moving means, said means being operably connected with another of said bifurcations.

49. In a device of the class described, the combination of brackets constructed to be secured to a vehicle, a frame connected to said brackets, fender sections secured to the frame, one of said fender sections being movable with respect to the frame, means for moving said section, said means being connected to one of the brackets.

50. In a device of the class described, the combination of brackets constructed to be secured to a vehicle, a frame connected to said brackets, fender sections secured to the frame, one of said fender sections being movable with respect to the frame, means for moving said section, said means being connected to one of the brackets, and means resisting the movement of said section in one direction, said means being mounted upon one of the brackets.

51. In a fender the combination of a fender section constructed to assume an operative and inoperative position, means for moving said section to an inoperative position, said means being movable to a certain position to cause said fender section to be moved to an inoperative position and upon a further movement to cause said fender section to be locked in said inoperative position.

52. In a fender the combination of a scoop section normally occupying a lowered position and pivoted means for moving said scoop section into inoperative position, the pivots of said means being movable into a position to lock the scoop section in inoperative position.

53. In a fender the combination of a scoop section constructed to be raised and lowered and normally occupying a lowered position, and pivoted means for raising said scoop section, the pivots of said means being movable into a position to lock the scoop section in raised position, and said means controlling the lowering of the scoop sections.

54. In a fender the combination of a scoop section normally occupying a lowered position, pivoted means for moving the scoop section into inoperative position, the pivots of said means being movable into a position to lock the scoop section in inoperative position and means for holding the pivots in said last named position, said last mentioned means being yieldable to permit movement of the pivoted means to allow the scoop section to be lowered.

55. In a fender the combination of a movable fender portion, and pivoted means for moving said section into inoperative position, the pivots of said means being movable into a position to lock the fender portion in inoperative position.

56. A fender including a fender section mounted for swinging movement into and out of active position, means operable to swing the section upwardly to inactive position, and an element having operative connection with the fender and arranged to assist in moving the fender toward inactive position.

57. In a fender the combination of a scoop section normally occupying a lowered position, means for moving the scoop section into inoperative position, said means being movable into a position to lock the scoop section in inoperative position, and means for holding the pivots in said last named position, said last mentioned means being yieldable to permit movement of the first mentioned means to allow the scoop section to be lowered.

58. A fender including a scoop section, said scoop section being movable into operative and inoperative position, means for moving said scoop section, said means including a lever and a link which may be positioned to prevent ... scoop section.

In witness whereof, we hereunto subscribe our names this 19th day of March, A. D. 1918.

CARL C. JENSEN.
GEORGE H. IRWIN.